United States Patent [19]

Weman

[11] 4,065,069

[45] Dec. 27, 1977

[54] EMERGENCY LOCKING RETRACTOR

[75] Inventor: Per Olaf Weman, Haslah, Germany

[73] Assignee: Sigmatex, A.G., Basel, Switzerland

[21] Appl. No.: 402,448

[22] Filed: Oct. 1, 1973

Related U.S. Application Data

[63] Continuation-in-part of Ser. No. 342,236, March 16, 1973, abandoned.

[51] Int. Cl.² ............... A62B 35/02; B65H 75/48
[52] U.S. Cl. ............... 242/107.4 A; 242/107.4 C
[58] Field of Search ........... 242/107.4, 107 SB, 107.2, 242/107.3, 107.5, 107 R, 107.4 R, 107.4 A, 107.4 C; 297/386, 387, 388; 280/150 SB

[56] References Cited

U.S. PATENT DOCUMENTS

| 3,430,891 | 3/1969 | Burleigh | 242/107.4 |
| 3,450,368 | 6/1969 | Glauser et al. | 242/107.4 |
| 3,593,942 | 7/1971 | Rex | 242/107.4 |
| 3,664,600 | 5/1972 | Sargeant | 242/107.4 |
| 3,770,224 | 11/1973 | Hayashi et al. | 242/107.4 |
| 3,802,642 | 4/1974 | Klink | 242/107.4 |
| 3,825,205 | 7/1974 | Takada | 242/107.4 |

Primary Examiner—Billy S. Taylor
Attorney, Agent, or Firm—Ernest D. Buff

[57] ABSTRACT

An emergency locking vehicle seat belt retractor includes a flywheel supported for rotation with the reel and normally urged into rotation with the reel by a spring supported between the reel and the flywheel; when the reel accelerates rapidly in the belt extending direction, as in an accident when the occupant moves forward quickly, the inertia of the flywheel causes it to resist the spring pressure and slip relative to the reel. A dog is supported between the flywheel and the reel in such a manner that it extends in a radial direction in response to this slippage and engages an internal ratchet formed on an actuating arm rotatably supported relative to the reel axis. The dog transfers the rotational motion of the reel to the arm causing it to contact and force the pawl to engage a circular ratchet formed on the reel to lock the reel against further extending rotation. The pawl may also be actuated into locking condition by an arm connected to a pendulum so as to sense either a sudden deceleration of the vehicle or a substantial shift of the vehicle from its horizontal orientation.

10 Claims, 7 Drawing Figures

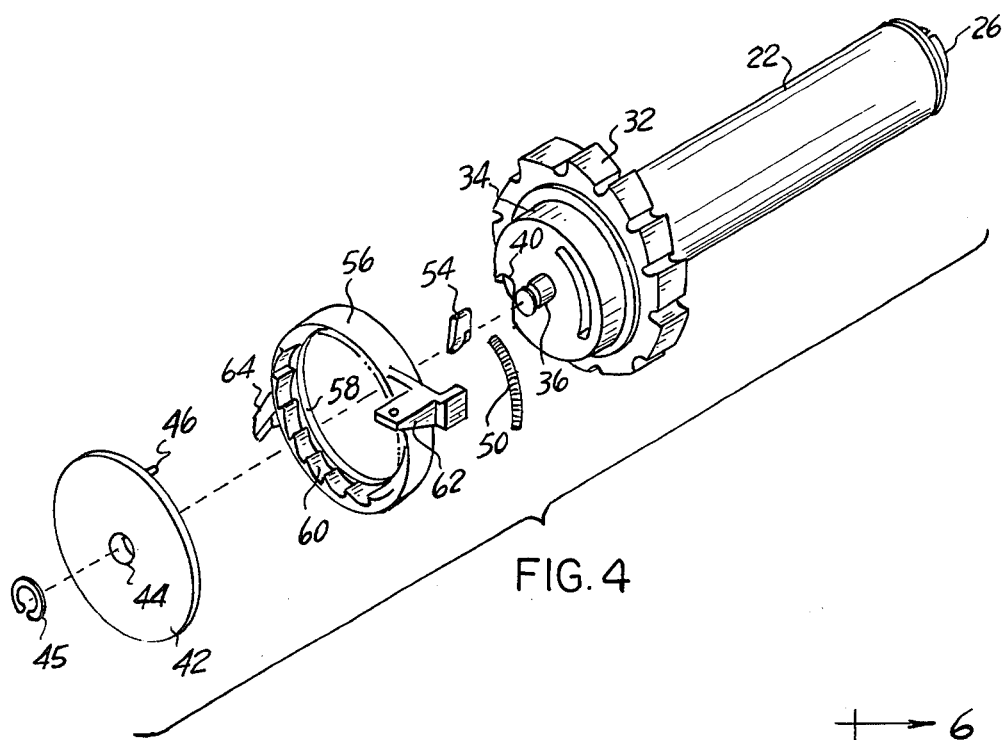
FIG. 4
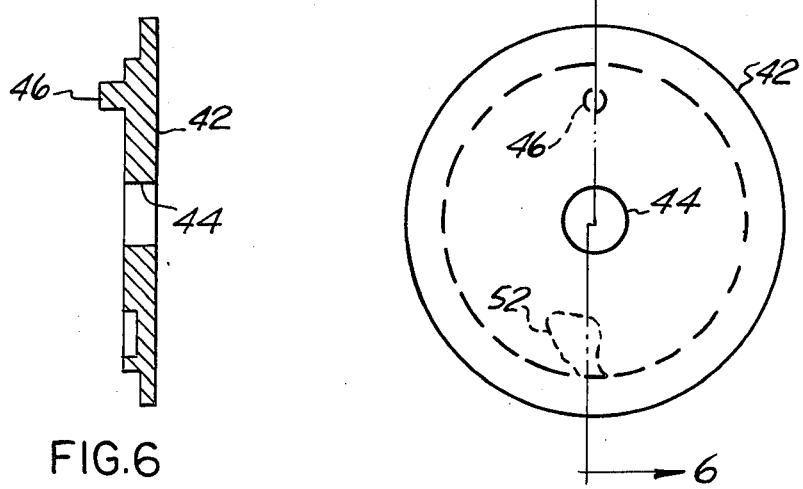
FIG. 6
FIG. 5

EMERGENCY LOCKING RETRACTOR

CROSS-REFERENCE TO RELATED APPLICATION

This application is a continuation-in-part application of U.S. Ser. No. 342,236, filed Mar. 16, 1973 of the same applicant and entitled "Emergency Locking Retractor" now abandoned.

BACKGROUND OF THE INVENTION

1. Field of the Invention

This invention relates to belt retractors for vehicle occupant restraint systems and more particularly to reel type retractors which lock against rotation in a belt-extending direction under emergency conditions.

2. Prior Art

Reel type seat belt retractors which allow extension of the belt in response to a pull under normal operating conditions but which sense a sudden pull on the belt or deceleration of the vehicle as may occur in an accident to lock the reel against further belt extension provide a number of advantages over alternate forms of retractors. They allow the belt system to be used by occupants of different size without adjustment, and allow the occupant to move freely in his seat without releasing the belt or causing the belt to tighten on the occupant as webbing retraction sensitive systems do. Despite these advantages, the adoption of acceleration sensitive locking retractors has been hindered because of the lack of a relatively simple and reliable design. Several factors tend to complicate the retractors of this type and at the same time reduce their reliability. There is the antithetical design requirement that a relatively small force actuate the locking mechanism which must withstand the very high forces generated by the impact of the moving occupant's body in a sudden vehicle deceleration. Another design problem relates to the fact that the reel must be stopped while it is moving relatively rapidly and locking parts do not always meet in the same position.

One known type of emergency locking retractor employs a rotatable flywheel supported on the reel urged by a spring to move with the reel in a web extending direction. If the reel accelerates relatively slowly, as it does in normal usage, the forces required to overcome the inertia of the flywheel will not be sufficient to compress the spring and the flywheel will rotate with the reel; however, when the reel is rapidly accelerated as by the occupant's body moving forward rapidly in the seat, the inertia forces cause the flywheel to slip relative to the reel, compressing the spring. A dog is supported in a pair of complementary cavities formed in the flywheel and reel so that it moves outward radially in response to relative motion between the two and engages an internal circular ratchet surface formed on a member which is fixed to the reel base. This engagement locks the reel against further rotation. In retractors of this design, the dog must be relatively light weight so the flywheel is well balanced yet the dog must withstand the impact of its engagement with the stationary ratchet and absorb the forces which restrain the occupant's body against forward motion. Since the dog may move outwardly at any angular position of the reel, difficulty is encountered in designing the dog and ratchet to withstand the large impact forces.

SUMMARY OF THE INVENTION

The present invention is addressed to improvements in inertia locking reels of this type wherein the locking forces are not exerted directly on the dog, but rather the dog acts to couple an actuating arm to the wheel and the actuating arm moves a relatively heavy pawl into locking engagement with a reel supported ratchet. In this design, the dog may be relatively delicate so as to impose only minor unbalancing forces on the flywheel. Additionally, the lack of orientation between the point of extension of the dog and the locking surfaces of the ratchet is taken up during the relatively low force contact between the dog and the actuating arm so that the engagement of the locking pawl with the reel ratchet always occurs at the same angle relative to the teeth of the ratchet. The arrangement thus acts to synchronize the movement of the locking pawl with the rotation of the reel.

In a preferred embodiment of the invention which will subsequently be described in detail, the actuator arm has an annular section rotatably supported relative to the reel. A ratchet surface is formed on the interior of this annular section and the surface is supported concentrically around the exterior of the flywheel. A spring coupled between the actuator and the reel base normally restrains the arm against rotation so that it remains stationary when the reel rotates. However, when the flywheel slips relative to the reel because of a rapid rotational acceleration of the reel, the dog moves radially outwardly and engages a tooth on the internal ratchet surface of the actuator arm. The dog then transfers the motion of the reel to the actuator arm causing it to rotate against its spring bias. The rotation brings it into contact with a pivotably mounted pawl forcing the pawl into engagement with the reel supported ratchet, locking the reel against further rotation.

The internal ratchet surface formed on the actuator arm preferably has the same number of teeth as the reel supported locking ratchet. Since the pawl is moved into engagement with the locking ratchet as a result of motion of the reel its angle of contact with the ratchet teeth is always constant, obviating the possibility of it hitting an edge of a ratchet tooth. The actuator arm therefore acts to synchronize the locking pawl motion to the rotation of the reel and compensates for the uncertainty about the time of extension of the dog.

The use of an independent locking pawl moved by the actuating arm allows the pawl to be energized by additional mechanism sensitive to the deceleration and/or orientation of the vehicle. In the preferred embodiment of the invention a pendulum is mounted so that it swings in response to a sudden deceleration of the car or a movement of the car substantially out of the horizontal plane such as occurs when the car turns over or climbs a steep grade. The inclination of the pendulum swings an arm which drives the locking pawl to engagement with the reel ratchet. The driver is thereby retained securely in his seat under conditions which may not cause a sudden pull on the seat belt.

Other objectives, advantages and applications of the invention will be made apparent by the following detailed description of two embodiments of the invention. The description makes reference to the accompanying drawings in which:

FIG. 4 is an exploded perspective view of certain parts of the inertia locking mechanism;

FIG. 5 is a front view of the flywheel which forms part of the inertia locking mechanism;

FIG. 6 is a sectional view through the flywheel taken along line 6—6 of FIG. 5.

Figure 1:
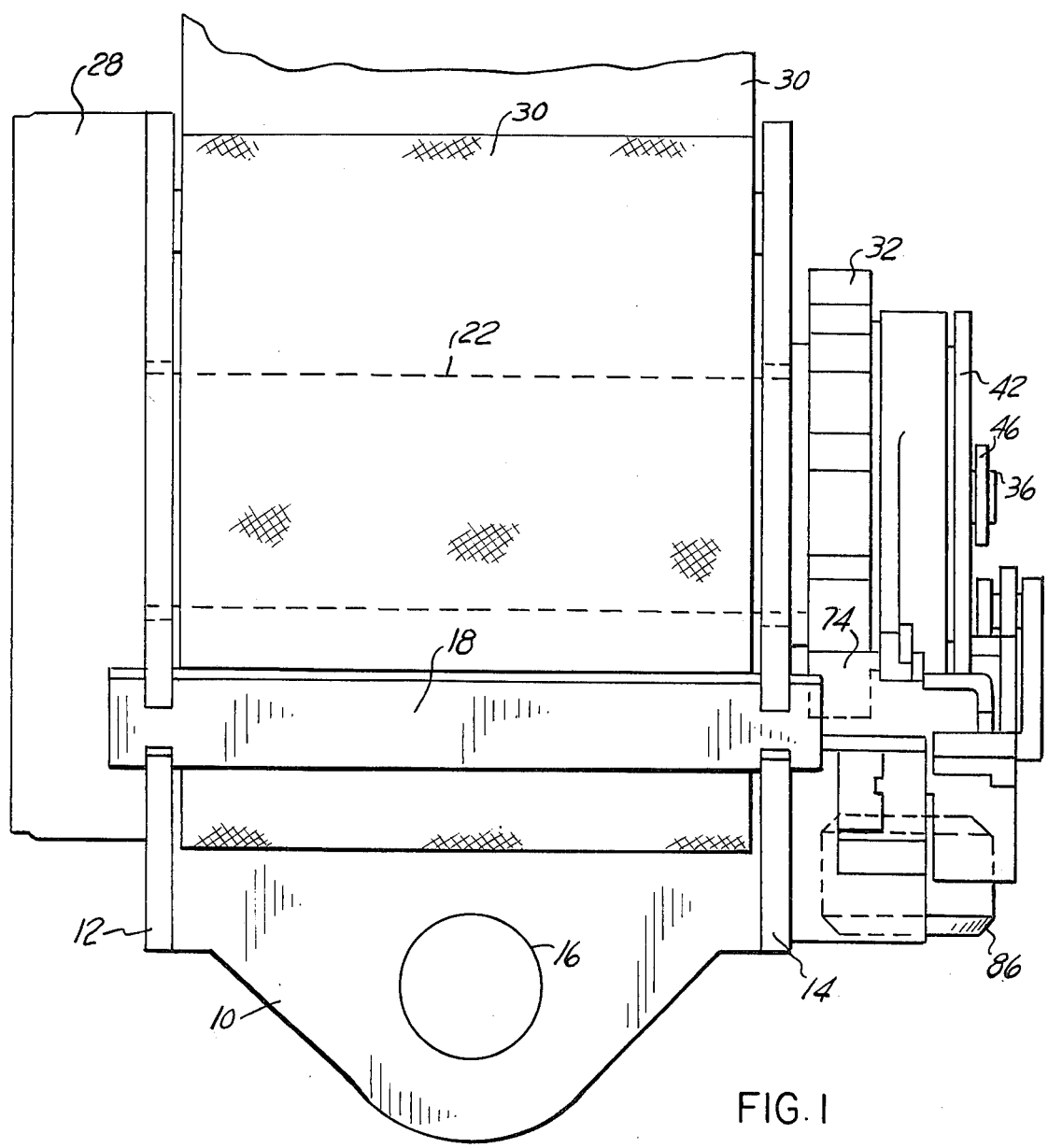
FIG. 1 is a front view of a locking retractor formed in accordance with a first, preferred embodiment of the invention.

Referring to the drawings a retractor formed in accordance with the preferred embodiment of the invention employs a base formed of steel plate and comprising a back plate 10 and a pair of parallel side plates 12 and 14 extending normally to the back plate 10 on opposite sides thereof. The back plate 10 has a mounting hole 16 allowing it to be secured to the vehicle with an appropriate fastener. The retractor may be employed with either a seat belt or a shoulder harness or some combination thereof such as a three-point belt assembly. When employed with a seat belt the back plate 10 is normally mounted vertically on the side of the vehicle seat. The preferred embodiment of the invention is designed for that type of installation.

A steel tie bar 18 has its ends fixed in notches formed in the side plates 12 and 14 adjacent to their outer edges, extends normally to the side plates, and acts to rigidify the base structure. An elongated steel rod 20 has its ends fixed in notches formed in the two side plates 12 and 14 adjacent to the upper side of the back plate. This rod 20 acts as a guide for a belt section wound around the reel.

The reel shaft 22 is formed of a steel tube and is best seen in FIG. 4. The shaft is rotatably journaled in opposed holes formed in the side plates 12 and 14. A notched end member 26 is fixed to one end of the shaft and projects beyond the end plate 12. A spirally wound steel strip spring (not shown) engages the end connector 26. The spring is protected by a cover member 28. The spring is wound so as to urge the reel 22 toward rotation in a particular direction.

A seat belt webbing member 30 has one end fixed to the shaft 22, between the side plates 12 and 14 in a conventional manner. The free end of the webbing 30 extends upwardly from the retractor as shown in FIG. 1 and the rod 20 bears against the webbing to limit its angle of emergence and entry from the retractor.

The spring rotates shaft 22 so as to wind the webbing section 30 thereon. The force of the spring may be overcome by a pull on the webbing so that the webbing extends from the retractor. Thus the shaft 22 along with the back plate 10 and the two side plates 12 and 14 constitute a reel for storage and retention of the webbing 30.

The end of the shaft which extends through the side plate 14 has a locking ratchet wheel 32 affixed thereto. A short cylindrical section 34 of the shaft extends beyond the far side of the ratchet 32 and a smaller diameter pilot shaft section 36 projects beyond the end of the cylindrical section 34. The face of the cylindrical section 34 has a circumferentially extending groove 38 formed through an arc of approximately 120°. A generally triangular pocket 40 is also formed in the face of the cylindrical section 34 adjacent to and opening to an edge thereof.

A disc shaped flywheel 42 has one surface lying against the face of the cylindrical section 34. The pilot shaft 36 passes through a central hole 44 in the flywheel and the flywheel is retained on the shaft 36 by split ring 45 which fits in a groove on the pilot shaft. The flywheel 42 makes a sliding fit with the shaft section 36 and is free to rotate thereon.

A cylindrical knob 46 projects from the face of the flywheel 42 which abuts the face of the cylindrical section 34 and extends into the groove 38. A spirally wound wire compression spring 50 is disposed within the groove 38 with one end bearing against an end of the groove and the other end bearing against the knob 46 formed on the flywheel 42. When the reel is stationary the spring 50 presses the knob 46 against one end wall of the groove 38 to maintain the flywheel 42 at a particular angular orientation relative to the reel.

A pocket 52 is formed in the face of the flywheel 42 which abuts the face of the cylindrical section 34. This pocket is formed in direct opposition to the pocket 40 formed in the face of the cylindrical section 34 when the flywheel is in its normal rotative position relative to the reel.

Figure 3:
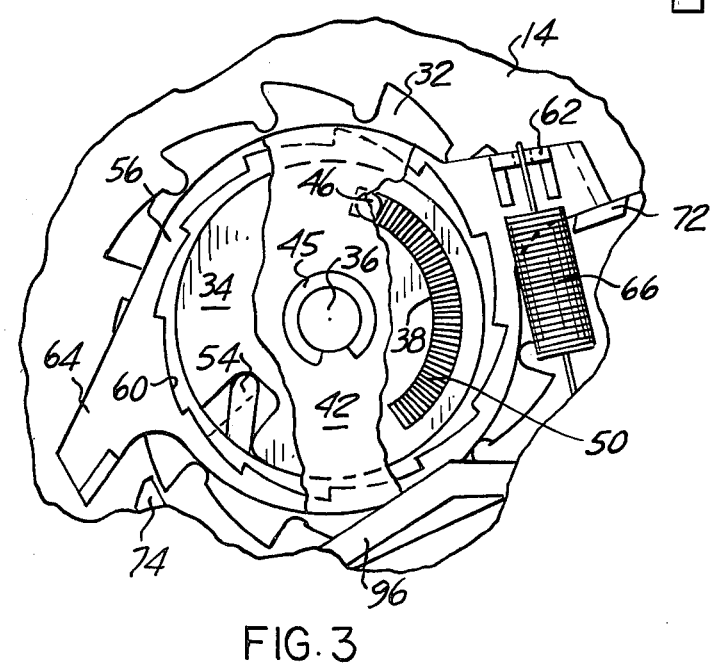
FIG. 3 is a detailed section of a portion of the inertia locking mechanism of the retractor of FIG. 1 as viewed from the right side, with parts broken away for purposes of illustration.

The two pockets 40 and 52 retain a locking dog 54 in a manner best seen in FIG. 3. One side of the dog fits within the pocket 40 and the opposite side fits within the pocket 52. When the flywheel 42 is in its normal rotational position relative to the reel shaft, wherein the knob 46 is abutting one end of the groove 38, the outer edge of the dog 54 lies within the perimeter of the flywheel 42 and the cylindrical section 34, both of which have the same diameter, as is best seen in FIG. 3. However, when a rapid acceleration of the reel causes the flywheel 42 to compress the spring 50 and lag behind the reel, as will be subsequently described in detail, the dog 54 is pivoted into the phantom position illustrated in FIG. 3 wherein its end extends radially outward from the perimeter of the flywheel and the cylindrical section.

An annular actuator member 56 has an internal cylindrical shoulder 58 which rides on the outer surface of the cylindrical section 34. The two make a slip fit so that the actuator 56 is rotatable relative to the shaft. An internal toothed ratchet 60 is formed on the actuator and this ratchet overlies both the flywheel 42 and the proximate section of the cylindrical member 34 so as to cover the pockets 40 and 52 formed in those members. The actuator 56 is preferably a plastic injection molding and has a spring retaining arm and stop member 62 projecting outward from its perimeter and an actuator arm 64 extending outward from its perimeter on the diametrically opposed side from the member 62.

A spirally wound wire tension spring 66 has one end coupled to the member 62 and the other end fixed to a molding 68 which is retained to the side plate 14 by a screw 70. The spring 66 urges the actuator 56 against a stop member 72 formed as part of the molding 68 and extending outward normally from the side plate 14. A section on the arm 62 is urged against the stop 72 by the spring 66. When the reel rotates at a normal rate because of a pull on the webbing 30, the actuator 56 remains stationary; however, when a sudden pull on the belt rapidly accelerates the reel so that the inertia forces of the flywheel 42 momentarily exceed the compressive force of the spring 50 so that the flywheel slips relative to the reel, the dog 54 is pivoted outwardly into the phantom position shown in FIG. 3 so that the counterclockwise, belt-extending rotation of the reel brings the outer edge of the dog into contact with a tooth of the ratchet 60. This effectively couples the actuator 56 to the reel so that the actuator rotates in a counterclockwise direction as viewed in FIGS. 2 and 3, extending the spring 66.

Figure 2:
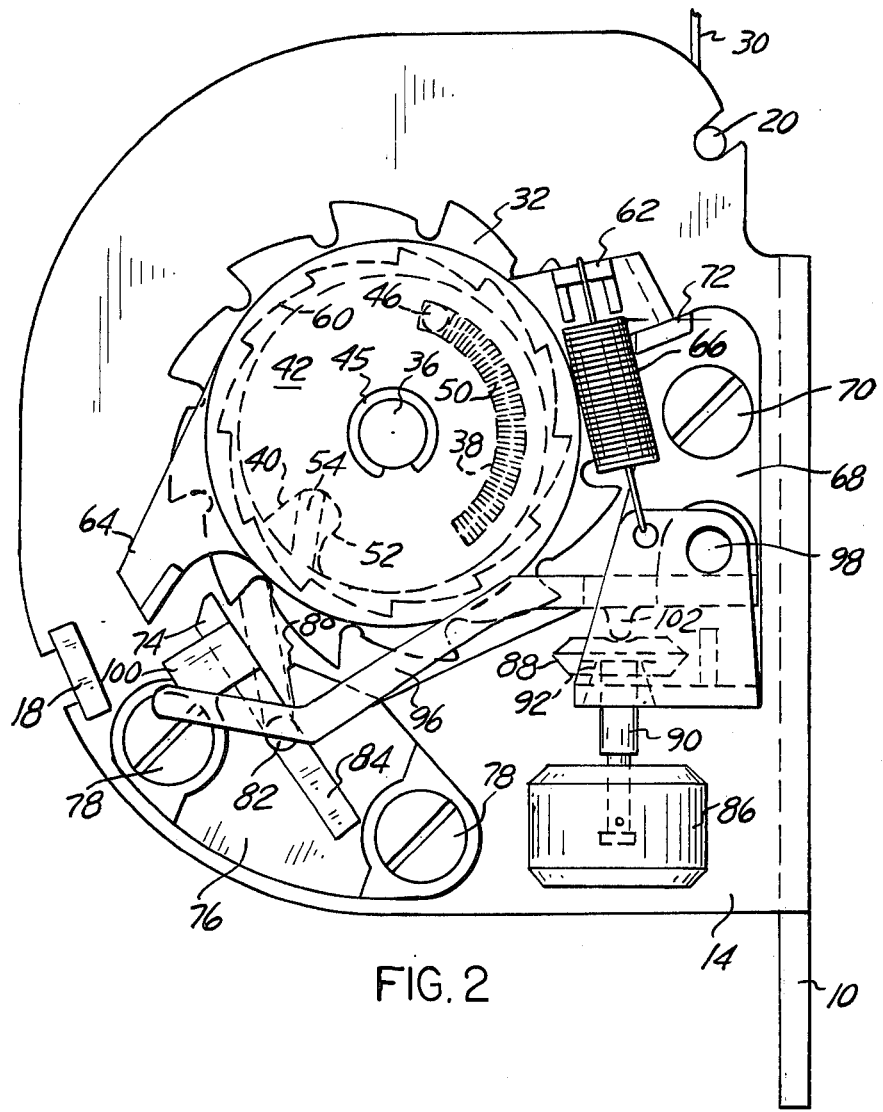
FIG. 2 is a side view of the retractor of FIG. 1 as viewed from the right side of FIG. 1.

A belt locking pawl 74, best seen in FIG. 2, is pivotably supported on a bracket 76 fixed to the side plate 14 by a pair of screws 78. The bracket has a slot 80 formed in its side which cradles an elongated section 82 formed along the center of the pawl. A counterweight section 84 of the pawl extends from the intermediate section 82 in a direction opposite to the pawl 74 itself. When the retractor is in the position illustrated in FIG. 2 the gravity forces on these two sections maintain the pawl in the position shown in full lines in FIG. 2 wherein it clears the teeth of the ratchet 32 as the reel rotates and accordingly does not impose any restraining forces on the reel's rotation. When the actuator arm 64 moves in a counterclockwise direction as a result of slippage between the flywheel and the reel, extending the dog 54, the arm 64 contacts the pawl 74 and urges it to rotate in a clockwise direction as viewed in FIG. 2 so that it engages one of the ratchet teeth 32 and prevents further rotation of the reel. The reel locking forces are imposed directly upon the heavy ratchet teeth 32 and the heavy pawl 74 and are transferred to the side plate 14 through the metal bracket 76. None of these forces are imposed on the actuator 56, the dog 54 or the flywheel 42.

Since the actuator arm moves with the reel during its approach to the pawl 74 and its rotational position relative to the reel is controlled by the position of the teeth on the internal ratchet 60, the pawl, when moved by the actuating arm 64, always approaches the teeth of the ratchet 32 at the same angle relative to the ratchet teeth and independently of the point at which slippage of the flywheel 42 relative to the wheel causes the dog 54 to move radially outwardly. This eliminates the possibility of the high impact force between the stationary pawl and the rapidly moving reel being exerted on the edges of the ratchet teeth.

Since the locking mechanism for the reel is not connected to the inertia actuating mechanism except during emergency conditions, alternative means may be provided for causing locking. In the preferred embodiment a weight 86 is connected to a cup-shaped mounting member 88 by means of an arm 90. The cup is supported on a knob 92 formed as part of the molding 68 and the rod 90 passes through a hole formed in the center of the knob. The weight 86 is thus pendulously supported by the cup and is free to pivot in any direction as a result of inertia forces or a change in orientation of the vehicle.

A sensor arm 96 is pivotably mounted about a hinge pin 98 which is journalled in a bracket formed as part of the molding 68. The arm 96 extends outwardly from its pivot point so that its far end contacts a tab 100 forming part of a locking pawl 74. The arm 96 has a button 102 which bears against a cup-shaped depression on the upper surface of the member 88. Gravity forces tend to move the arm 96 in a counterclockwise direction as viewed in FIG. 2 about its mounting pin 98 and thereby urge the button 102 into contact with the upper surface of the member 88. When the weight 86 pivots as a result of the inertia forces generated by sudden deceleration of the vehicle or as a result of the vehicle moving sharply out of a horizontal attitude, the member 88 pivots so as to lift against the projection 102 and move the arm 96 in a clockwise direction forcing the pawl 74 into its locking position.

In operation, when no force is exerted on the webbing 30 the spring will cause the shaft to rotate so as to pull the webbing into a fully retracted position. When an occupant desires to engage the webbing he may merely pull the webbing outwardly to engage the seat belt buckle. The force exerted by the spring 50 on the flywheel 42 will be sufficient to overcome any inertia forces of the flywheel during such a normal extension so that the flywheel will rotate in fixed relationship with the reel. Likewise after the seat belt assembly is locked if the occupant moves about in his seat to adjust the controls, open a door, reach for the glove compartment, or the like, the reel will extend against the normal pulls thus exerted on the webbing 30 and will retract the webbing when the force is released to snug up the belt.

In the event of an accident such as a head-on collision which would tend to force the occupant forward in his seat an extremely rapid pull will be exerted on the webbing 30 and the inertia forces which tend to cause the flywheel to remain stationary will momentarily exceed the force imposed on the flywheel by spring 50. Accordingly, the spring will compress and the flywheel will alter its rotational position relative to the reel. As previously indicated, the shift of the pockets 40 and 52 relative to one another will cause the dog 54 to pivot radially outwardly into the position indicated by phantom lines in FIG. 3. It will then engage a tooth on the internal ratchet surface 60 and effectively lock the actuator 56 to the reel so that the actuator moves in a counterclockwise direction as viewed in FIG. 2. The actuator arm 64 will then contact the pawl 74 and press it into engagement with one of the teeth of the ratchet 32 locking the reel against further belt extending rotation so as to retain the occupant in his seat.

Similarly under those conditions wherein the weight 86 tilts relative to the balance of the retractor the arm 96 will force the ratchet into this locking engagement.

Figure 7:
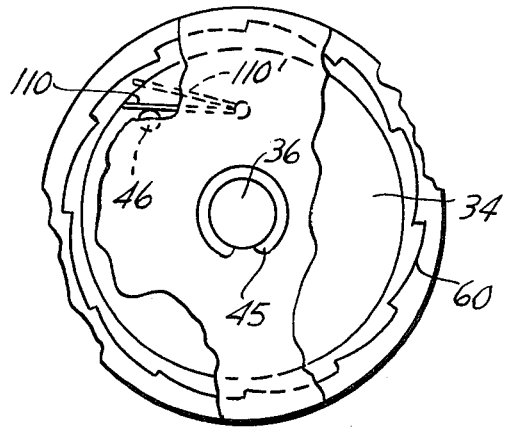
FIG. 7 is a detailed sectional view of a modified form of the inertia locking mechanism.

A modified form of my locking retractor, illustrated in FIG. 7, effectively simplifies the construction previously disclosed in that it combines the dog 54 and the spring 50 which biases the flywheel 42 toward motion with the reel, into a single component.

As illustrated in FIG. 7, a flat leaf spring 110 has one end fixed to a projection 112 extending axially from the cylindrical section 34 so that the spring projects outwardly parallel to the face of the section 34 toward the edge of the section and its free end normally lies adjacent to the edge of the cylindrical section 34.

The knob 46 formed on the flywheel 42 normally abuts the spring 110 and the rotary motion of the cylindrical section 34 is transferred to the flywheel 42 by the spring 110 bearing against the knob 46. Under normal accelerations of the reel the force exerted between the spring 110 and the knob 46 will be such that the spring will only slightly deflect and its free end will not project appreciably beyond the boundary of the cylindrical section 34; however, under unusual accelerations of the reel, the inertial force of the flywheel 42 will cause the spring 110 to deflect outwardly to the position 110' illustrated in FIG. 7, wherein the free end of the spring projects sufficiently beyond the circumference of the cylindrical section 34 so that the free end of the spring engages a tooth of the ratchet 60. This causes the actuator to move against the force of the spring 66 causing engagement of the pawl 74 with the ratchet 32, and locking the retractor against further belt extending motion.

The embodiments of the invention in which an exclusive property or privilege is claimed are defined as follows:

1. A seat belt retractor comprising: a rotatable reel shaft to which one end of a seat belt is fixed; a rotatable circular ratchet fixed to the reel shaft and rotatable therewith; a locking pawl movable between a first position wherein it allows rotation of the reel shaft in a belt extending direction and a second position wherein it engages said ratchet to prevent rotation of the reel shaft in the belt extending direction; and a first mechanism for locking said reel shaft in response to rotational acceleration of said reel shaft, said first mechanism comprising: a cylindrical section of said reel shaft, said cylindrical section having a face; a flywheel rotatably supported on the reel shaft for rotation thereon, said flywheel having a surface disposed adjacent to said face of said cylindrical section of said reel shaft; a spring supported on said face of said cylindrical section, said spring disposed between said cylindrical section and the flywheel surface, means projecting from said flywheel to said spring so as to urge the flywheel to rotate with the reel shaft when the reel shaft rotates in such a direction as to extend the belt; and actuator means including a locking dog separate from said locking pawl and adapted to be coupled to the reel shaft and to the flywheel and operative to urge said locking pawl into its second position upon the occurance of rotational acceleration of the reel shaft in the belt extending direction, whereby locking forces to prevent rotation of the reel shaft are exerted on said locking pawl, but not on said separate locking dog, thereby enabling said locking dog to be relatively light in weight in comparison to said locking pawl to avoid unbalancing said flywheel.

2. The retractor of claim 1 wherein said actuator means for moving the locking pawl into its second position upon slippage of the flywheel relative to the reel shaft further comprises: an actuator member, and a biasing means; said actuator member supported for motion between a first position wherein it does not engage said locking pawl and a second position wherein it engages said locking pawl; said face of said cylindrical section having an arcuate groove; said spring being a spirally wound compression spring disposed in said arcuate groove; said biasing means biasing said actuator member toward its first position; said locking dog supported between said flywheel and said cylindrical section of said reel shaft and operative to couple the reel shaft to the actuator member so as to move the actuator member into engagement with the locking pawl upon slippage of the flywheel relative to the reel shaft.

3. The retractor of claim 2 wherein the actuator member has an internal toothed ratchet and an actuator arm, said internal toothed ratchet being disposed circumferentially about the reel shaft and overlying at least a part of the flywheel and the cylindrical section of the reel shaft; and the dog contacts said ratchet surface upon slippage of the flywheel relative to the reel shaft causing said actuator arm move the locking pawl into its second position.

4. The retractor of claim 3 wherein the locking dog has motion radially outward relative to the reel shaft upon slippage of the flywheel relative to the reel shaft in order to engage the ratchet surface of the actuator member.

5. The retractor of claim 2 and further comprising a second mechanism for locking said reel shaft in response to deceleration or change in orientation of the vehicle to move said locking pawl from its first to its second position, said second mechanism being separate from and independent of said first mechanism.

6. The retractor of claim 5 wherein said second mechanism includes a pendulum, said pendulum comprising a weight, a cylindrical rod at the bottom of which said weight is connected, and a cupshaped member which supports said rod and said weight and enables said weight to pivot in any direction.

7. A vehicle seat belt retractor comprising: a reel shaft; an elongated belt section having one end fixed to the reel shaft; a locking member movable between a first position wherein it allows rotation of the reel in a belt extending direction and a second position wherein it locks the reel against rotation in a belt extending direction; first means for connecting the reel shaft to the locking member so as to move said locking member from its first position to its second position when the rate of rotational acceleration of the reel in a belt extending direction exceeds a predetermined level, said first means comprising a flywheel supported on the reel shaft for rotation about the reel shaft, second means connected between the flywheel and the reel shaft and operative to urge the flywheel toward rotation in the belt extending direction when the reel shaft rotates in the belt extending direction; and third means, separate from said locking member, supported at least partially on a portion of the reel shaft and movable toward the periphery of the reel shaft upon slippage of the flywheel relative to the reel shaft, whereby locking forces to prevent rotation of the reel shaft are exerted on locking member, but not on said separate locking dog.

8. The retractor of claim 7 wherein said second means connected between the flywheel and the reel shaft and operative to urge the flywheel toward rotation in a belt extending direction when the reel rotates in a belt extending direction, and said third means supported at least partially on a portion of the reel shaft are both constituted by an elongated resilient member having one end fixed between a portion of the reel shaft and the flywheel at a point displaced from the center of the portion of the reel shaft and flywheel, said resilient member normally extending along a non-radial line so that its free end is adjacent to the periphery of the flywheel, whereby slippage of the flywheel relative to the reel shaft moves the free end of the resilient member radially outward relative to the reel shaft.

9. The retractor of claim 7 wherein said third means supported at least partially on a portion of the reel shaft and movable toward the periphery of the reel shaft upon slippage of the flywheel relative to the reel shaft comprises a locking dog coupled to the flywheel.

10. A seat belt retractor comprising: a reel shaft to which one end of a seat belt is fixed; a circular ratchet fixed to the reel shaft; a locking pawl movable between a first position wherein it allows rotation of the reel shaft in a belt extending direction and a second position wherein it engages said ratchet to prevent rotation of the reel shaft in the belt extending direction; and a first mechanism for locking said reel shaft in response to rotational acceleration of said reel shaft, said first mechanism comprising: a cylindrical section of said reel shaft, said cylindrical section having a face; a flywheel rotatably supported on the reel shaft for rotation thereon, said flywheel having a surface disposed adjacent to said face of said cylindrical section of said reel shaft; a spring supported on said face of said cylindrical section, said spring disposed between said cylindrical section and the flywheel surface, means projecting from said flywheel to said spring so as to urge the flywheel to rotate with the reel shaft when the reel shaft rotates in such a direction as to extend the belt; and actuator means including a locking dog separate from said locking pawl and adapted to be coupled to the reel shaft and to the flywheel and operative to urge said locking pawl into its second position upon the occurrence of rotational acceleration of the reel shaft in the belt extending direction, whereby locking forces to prevent rotation of the reel shaft are exerted on said locking pawl, but not on said separate locking dog, thereby enabling said locking dog to be relatively light in weight in comparison to said locking pawl to avoid unbalancing said flywheel; and wherein:

said actuator means for moving the locking pawl into its second position upon slippage of the flywheel relative to the reel shaft further comprises: an actuator member, and a biasing means; said actuator member supported for motion between a first position wherein it does not engage said locking pawl and a second position wherein it engages said locking pawl; said face of said cyclindrical section having an arcuate groove; said spring being a spirally wound compression spring disposed in said arcuate groove; said biasing means biasing said actuator member towards its first position; said locking dog supported between said flywheel and said cylindrical section of said reel shaft and operative to couple the reel shaft to the actuator member so as to move the actuator member into engagement with the locking pawl upon slippage of the flywheel relative to the reel shaft;

said actuator member has an internal toothed ratchet and an actuator arm, said internal toothed ratchet being disposed circumferentially about the reel shaft and overlying at least a part of the flywheel and the cylindrical section of the reel shaft; and the dog contacts said ratchet surface upon slippage of the flywheel relative to the reel shaft causing said actuator arm to move the locking pawl into its second position; and said internal toothed ratchet of the actuator member has the same number of teeth as the circular ratchet fixed to the reel shaft so that the locking pawl moves into engagement with the ratchet fixed to the reel shaft at the same angle relative to the ratchet teeth and independently of the rotational position at which the dog moves into engagement with the actuator member.

* * * * *

UNITED STATES PATENT OFFICE
CERTIFICATE OF CORRECTION

Patent No. 4,065,069              Dated December 27, 1977

Inventor(s) Per Olof Weman

It is certified that error appears in the above-identified patent and that said Letters Patent are hereby corrected as shown below:

The inventor name should read:

-- Per Olof Weman --.

*Signed and Sealed this*

*Twenty-fifth* Day of *July 1978*

[SEAL]

Attest:

RUTH C. MASON
*Attesting Officer*

DONALD W. BANNER
*Commissioner of Patents and Trademarks*